US012241806B2

(12) United States Patent
Linne (10) Patent No.: US 12,241,806 B2
(45) Date of Patent: Mar. 4, 2025

(54) CONDITION MONITORING DEVICE FOR MONITORING THE CONDITION OF A MECHANICAL MACHINE COMPONENT (71) Applicant: Phoenix Contact GmbH & Co. KG, Blomberg (DE)

(72) Inventor: Michael Linne, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 467 days.

(21) Appl. No.: 16/603,917

(22) PCT Filed: Apr. 6, 2018

(86) PCT No.: PCT/EP2018/000166
§ 371 (c)(1),
(2) Date: Oct. 9, 2019

(87) PCT Pub. No.: WO2018/188780
PCT Pub. Date: Oct. 18, 2018

(65) Prior Publication Data
US 2020/0080916 A1 Mar. 12, 2020

(30) Foreign Application Priority Data
Apr. 11, 2017 (DE) .................. 10 2017 107 814.2

(51) Int. Cl.
G01M 13/045 (2019.01)
F16C 19/52 (2006.01)
G05B 19/042 (2006.01)

(52) U.S. Cl.
CPC ......... G01M 13/045 (2013.01); F16C 19/527 (2013.01); G05B 19/0423 (2013.01);
(Continued)

(58) Field of Classification Search
CPC ........ F16C 17/00; F16C 19/00; F16C 19/527; F16C 2233/00; F16C 19/52;
(Continued)

(56) References Cited

U.S. PATENT DOCUMENTS 6,148,258 A 11/2000 Boisvert et al.
6,199,018 B1 3/2001 Quist et al.
(Continued)

FOREIGN PATENT DOCUMENTS

CN 1401971 A 3/2003
CN 1669353 A 9/2005
(Continued)

OTHER PUBLICATIONS

Texas Instruments Deutschland GmbH, IO-Link PHY-Bausteine mit eingebauten Fehlerschutz-Funktionen, Erschienen am: Jan. 10, 2013, Ausgabe SPS-MAGAZIN 10 2013, https://www.sps-magazin.de/?inc.=artikel/article_show&nr=80815 (downloaded Dec. 15, 2017), 4 pgs.
(Continued)

Primary Examiner — Giovanni Astacio-Oquendo
Assistant Examiner — Martin Walter Braunlich
(74) Attorney, Agent, or Firm — Holland & Hart LLP (57) ABSTRACT The present disclosure relates to a condition monitoring device for monitoring a condition of a mechanical machine component. The condition monitoring device may include a vibration sensor configured to detect mechanical vibrations on the mechanical machine component; a controller coupled to the vibration sensor and configured to determine a condition of the mechanical machine component based at least in part on measurement data generated by the vibration sensor; and a wired communication interface coupled to the controller and configured to communicate with an external control device, wherein, based at least in part on a request to
(Continued)

provide information about the condition of the mechanical machine component, the controller is configured to transmit the requested information via the wired communication interface.

15 Claims, 4 Drawing Sheets

(52) U.S. Cl.
CPC ...... *F16C 2233/00* (2013.01); *G05B 2219/25428* (2013.01); *G05B 2219/37494* (2013.01)

(58) Field of Classification Search
CPC ...... G05B 19/0423; G05B 2219/25428; G05B 2219/37494; G05B 2219/37434; G01M 13/045; G01M 13/028; G01M 15/12; G01M 3/24; G01M 3/243; G01M 13/04; G01M 7/00; G01H 1/003; G01H 17/00; G01H 3/00; G01H 1/00; G01H 1/14; G01H 1/16

See application file for complete search history.

(56) References Cited

U.S. PATENT DOCUMENTS

| | | | |
|---|---|---|---|
| 6,789,030 | B1 | 9/2004 | Coyle et al. |
| 7,093,492 | B2 | 8/2006 | Treiber et al. |
| 7,142,990 | B2* | 11/2006 | Bouse ............... G05B 23/0229 702/35 |
| 7,593,784 | B2* | 9/2009 | Carle ............... G05B 23/0229 700/175 |
| 8,924,600 | B2* | 12/2014 | Alley ............... G06F 13/385 710/5 |
| 9,133,727 | B2* | 9/2015 | Nolfi ............... F01D 17/02 |
| 9,483,429 | B2* | 11/2016 | Paycher ............... G06F 13/385 |
| 9,897,516 | B2* | 2/2018 | Bechhoefer ......... G01M 13/00 |
| 9,946,680 | B2* | 4/2018 | Chavez ............... G05B 19/0421 |
| 10,291,292 | B2* | 5/2019 | Rumler ............... G05B 15/02 |
| 10,330,523 | B2 | 6/2019 | Hedin |
| 2005/0155429 | A1 | 7/2005 | Griessler et al. |
| 2008/0082296 | A1 | 4/2008 | Robinson et al. |
| 2010/0231348 | A1* | 9/2010 | Hugget ............... G01H 1/003 340/3.42 |
| 2014/0090472 | A1 | 4/2014 | Lysen |
| 2014/0096627 | A1* | 4/2014 | Lysen ............... G01D 21/00 374/163 |
| 2014/0142872 | A1* | 5/2014 | Hedin ............... G05B 23/024 702/56 |
| 2015/0003503 | A1 | 1/2015 | Cassata et al. |
| 2015/0081230 | A1 | 3/2015 | Hamilton et al. |
| 2015/0168268 | A1 | 6/2015 | Fish et al. |
| 2016/0011076 | A1* | 1/2016 | Hamilton ............... G01M 13/04 702/34 |
| 2016/0294446 | A1* | 10/2016 | Rumler ............... H04B 5/0037 |
| 2020/0284694 | A1* | 9/2020 | Scott ............... G01H 1/00 |

FOREIGN PATENT DOCUMENTS

| | | | | |
|---|---|---|---|---|
| CN | 1761881 | A | 4/2006 | |
| CN | 102822644 | A | 12/2012 | |
| CN | 104280157 | A | 1/2015 | |
| CN | 104335022 | A | 2/2015 | |
| CN | 105632137 | A | 6/2016 | |
| DE | 102012106572 | A1 | 1/2013 | |
| EP | 0961918 | A1 | 12/1999 | |
| EP | 0 961 918 | B1 | 8/2004 | |
| ES | 2309311 | T3 * | 12/2008 | ......... B60R 21/0132 |
| WO | WO 98/01831 | A1 | 1/1998 | |
| WO | WO 03095956 | A2 | 11/2003 | |
| WO | WO-2013160053 | A1 * | 10/2013 | ............ F16C 19/522 |
| WO | WO-2015002617 | A1 | 1/2015 | |

OTHER PUBLICATIONS

Wikipedia: IO-Link, https://de.wikipedia.org/w/index.php?title=IO-Link&oldid=157275262 (downloaded Dec. 15, 2017), 2 pgs.
Wikipedia: Point-to-Point Protocol, https://de.wikipedia.org/w/index.php?title=Point-to-Point_Protocol&oldid=155060807 (downloaded Dec. 15, 2017), 8 pgs.
Wikipedia: Synchron-Serielle Schnittstelle, https://de.wikipedia.org/w/index.php?title=Synchron- Serielle_Schnittstelle&oldid=13 . . . (downloaded Dec. 15, 2017), 2 pgs.
Sew Eurodrive, "Addendum to the Assembly and Operating Instructions", FAG-Vibration Smart Check, SEW-Eurodrive, Version Nov. 2016, https://download.sew-eurodrive.com/download/pdf/23085312.pdf.
"Schwingungssensorik", contained in Journal A&D Fabrik 21, publish industry, Mar. 2011.
"Resistance Thermometer" of Wikipedia, Version of Feb. 13, 2017.
Extract from book "Elektrische Messtechnik", E. Schrüfer, Carl Hanser Verlag, 2. edition, 1984.
Extract from book, "Practical Design Techniques for Sensor Signal Conditioning", Analog Devices, ISBN-0-916550-20-6, 1999, https://www.analog.com/en/education/education-library/pracital-design-techniques-sensor-signal-conditioning.html.
Xie et al., "Design of IO-Link Communication Slave Device", School of Electrical Engineering, Southeast University, Nanjing 210096, Jiangsu, China, 4 pages.
Automation Panorama, IO Link, IO-Link Technology and Implementation, dated Oct. 2011, 3 pages.
Rong, Rockwell Automation, "A New Type of Field Devices Connecting Technology: IO-Link", Beijing, China, 4 pages.
O. Neufang, Lexikon Der Elektronik, Friedr. Vieweg & Sohn Verlagsgesellschaft mbH, Braunschweig 1983, 3 pages.

\* cited by examiner

CONDITION MONITORING DEVICE FOR MONITORING THE CONDITION OF A MECHANICAL MACHINE COMPONENT

CROSS-REFERENCES TO RELATED APPLICATIONS

This application is a 371 national phase entry of International Patent Application No. PCT/EP2018/000166, entitled "STATE MONITORING DEVICE FOR MONITORING THE STATE OF A MECHANICAL MACHINE COMPONENT," filed 6 Apr. 2018, which claims priority to German Patent Application No, 10 2017 107 814.2, entitled "ZUSTANDSÜBER WACHUNGSGERÄT ZUM ÜBERWACHEN DES ZUSTANDS EINER MECHANISCHEN MASCHINENKOMPONENTE," filed 11 Apr. 2017. Each of these applications is incorporated herein by reference.

TECHNICAL FIELD

The present disclosure relates to a condition monitoring device for monitoring the condition of a mechanical machine component. The disclosure in particular relates to an input output (IO)-link device for condition monitoring.

BACKGROUND

The condition monitoring (CM) is the condition monitoring of machines and their mechanical assemblies. The intent is essentially to monitor the condition of bearings and provide early detection of bearing damage, in order to avoid a failure of the machine. According to VDI Standard 3832, the condition of the bearing can be divided into "no damage", "slight predamage" and "bearing defective".

The condition of a bearing can be determined by means of a vibration measurement with an evaluation of the maximum occurring amplitude and the spectrum of the shock pulse. Combining the vibration measurement with a measurement of the bearing temperature and the speed, makes it possible to improve the assertions regarding the bearing condition even more.

The currently available fieldbus devices are equipped with only one of the above functions. In each case, therefore, one device is needed for the vibration measurement, one for the temperature measurement and one for the speed measurement. The fieldbus devices can only be operated in a control cabinet in a station and not in a decentralised manner, e.g., directly on a machine. Field devices for the vibration measurement are equipped with the connection of an expensive, external piezo sensor with an integrated Electronics Piero-Electric (IEPE) interface. The evaluation of all signals and thus of the condition of the machine takes place in a central, overlaid control system.

SUMMARY

It is the object of the present disclosure to create a concept for improved condition monitoring, in particular for improved condition monitoring of mechanical machine components.

The condition monitoring (CM) is the condition monitoring of machines and their mechanical assemblies. The intent is essentially to monitor the condition of bearings and provide early detection of bearing damage, in order to avoid a failure of the machine. According to VDI Standard 3832, the condition of the bearing can be divided into "no damage," "slight predamage" and "bearing defective."

This object is achieved by the subject matters having the features according to the independent claims. Advantageous examples are the subject matter of the dependent claims, the description and the drawings.

According to a first aspect, the object is achieved by a condition monitoring device for monitoring the condition of a mechanical machine component, comprising: a vibration sensor for detecting mechanical vibrations on the machine component; a controller, which is coupled to the vibration sensor, and is configured to determine a condition of the machine component on the basis of the measurement data generated by the vibration sensor; and a wired communication interface, which is coupled to the controller in terms of communication, for communicating with an external control device, wherein, based on a request to provide information about the condition of the machine component, the controller is configured to transmit the requested information via the wired communication interface.

Such a condition monitoring device achieves the technical advantage that the condition of a bearing and thus the condition of the machine or system can be determined. It is thus possible to detect wear and damage early and optimise the maintenance.

In an advantageous example of the condition monitoring device, the communication interface is configured to couple the condition monitoring device to the external control device via a point-to-point connection.

This achieves the technical advantage that the condition monitoring device can be operated in an easy and straightforward manner by the external control device.

In an advantageous example of the condition monitoring device, the communication interface is configured to supply the condition monitoring device with external direct current (DC) voltage.

Since it does not require its own power supply and a corresponding power supply unit or a battery, this achieves the technical advantage that the condition monitoring device can have a compact design.

In an advantageous example, the condition monitoring device comprises a DC converter, which is configured to convert the external DC voltage supplied via the communication interface into an internal system voltage.

This achieves the technical advantage that the externally provided supply voltage does not have to be the same as the internal system voltage. This allows greater flexibility in the design of the condition monitoring device.

In an advantageous example of the condition monitoring device, the controller is configured to operate as a slave in a master/slave operation and is controllable via the communication interface.

This achieves the technical advantage that conventional master/slave architectures can be used. The controller can be constructed in a power-efficient manner, because it has to operate only upon request of the master and can be in sleep mode for the remainder of the time.

In an advantageous example of the condition monitoring device, the communication interface comprises an IO-link interface.

The IO-link bus provides the advantageous option of screwing the device directly to the machine in a decentralised manner and establishing the bus connection to the power supply via only one cable.

In an advantageous example, the condition monitoring device comprises an IO-link physical layer (PHY) module, which is configured to transmit information about the condition of the machine component to the external control device.

This achieves the technical advantage that the design of the condition monitoring device is simplified, because a standard module can be used as an IO-link PHY module.

In an advantageous example, the condition monitoring device comprises a first input for connecting at least one external temperature sensor for recording at least one temperature of the machine component, wherein the controller is configured to further determine the condition of the machine component on the basis of measurement data from the first input.

The integration of the temperature input makes the diagnosis of the condition more accurate, because, in addition to the vibration behaviour, the temperature behaviour of the machine is taken into account as well.

In an advantageous example of the condition monitoring device, the first input comprises a plurality of resistance temperature detection (RTD) lines to connect at least one external resistance temperature sensor.

This achieves the technical advantage that a compact temperature measurement with resistance temperature sensors is made possible via the RTD lines. Thus, the entire condition monitoring device remains compact and can easily be attached to the machine component, e.g., a bearing.

In an advantageous example, the condition monitoring device comprises an internal power source, which is configured to drive a prespecified current through the at least one external resistance temperature sensor via the RTD lines.

This achieves the technical advantage that an efficient and compact temperature measurement can be realised that utilises the temperature behaviour of a resistor.

In an advantageous example, the condition monitoring device comprises a first analogue to digital (A/D) converter, which is configured to detect a voltage drop at the RTD lines and relay it to the controller converted to a digital value.

This achieves the technical advantage that the measured voltage drop, and thus the temperature value, can be transmitted to the microcontroller in an efficient manner.

In an advantageous example of the condition monitoring device, the controller is configured to calculate a resistance proportional to the measured temperature of the at least one resistance temperature sensor on the basis of the voltage drop at the RTD lines and the prespecified current driven via the RTD lines.

This achieves the technical advantage that the temperature measurement can be carried out very efficiently in the microcontroller using only a few operations, so that there is no need for a complex temperature sensor.

In an advantageous example, the condition monitoring device comprises a second input for connecting at least one external speed and/or position sensor for recording at least one speed and/or position of the machine component, and the controller is configured to further determine the condition of the machine component on the basis of measurement data from the second input.

The integration of the temperature and speed sensor inputs makes it possible to combine all the necessary signals for an optimum diagnosis of the condition into one device. The implementation costs can be reduced as well.

In an advantageous example, the condition monitoring device comprises at least one Synchronous Serial Interface (SSI), which is configured to read the measurement data of the at least one external speed and/or position sensor connected to the second input and transmit said data to the controller.

This achieves the technical advantage that the measurement data for the speed and/or position of the machine component can be input efficiently and transmitted to the microcontroller.

In an advantageous example of the condition monitoring device, the vibration sensor is configured as a micro-electromechanical systems (MEMS)-based semiconductor-based vibration sensor.

With a MEMS sensor that is integrated into the condition monitoring device, there is no longer the need to use expensive external piezo sensors that, for example, have to be coupled via an IEPE interface. With the used MEMS sensor, the vibration of the machine component, e.g., a bearing, can be measured with the required bandwidth.

In an advantageous example of the condition monitoring device, the controller is configured to determine an amplitude spectrum on the basis of the measurement data generated by the vibration sensor.

This achieves the technical advantage that vibrations occurring outside the permissible range of the machine component can easily be identified on the basis of the amplitude spectrum.

In an advantageous example, the condition monitoring device comprises a high-pass filter for filtering the measurement data generated by the vibration sensor; a rectifier for rectifying the high-pass filtered measurement data of the vibration sensor; and a second analogue to digital (A/D) converter for converting the rectified high-pass filtered measurement data of the vibration sensor to digital measurement data, wherein the controller is configured to determine the amplitude spectrum on the basis of the digital measurement data of the vibration sensor.

This achieves the technical advantage that the frequency range to be searched, in which a possible malfunction can occur, can easily be narrowed.

In an advantageous example of the condition monitoring device, the second A/D converter is integrated in the vibration sensor and the high-pass filter is realised as a function in the controller.

This achieves the technical advantage that the condition monitoring device can have a compact design and can thus easily be attached to the machine component.

In an advantageous example of the condition monitoring device, the communication interface comprises an M12 threaded coupling connector for activating the external control device and for the power supply.

This achieves the technical advantage that a compact and robust connection can be achieved, which does not loosen in the operating mode of the machine component so that reliable monitoring results are achieved.

According to a second aspect, the object is achieved by a method for monitoring the condition of a mechanical machine component, wherein the method comprises the following steps: Detection of mechanical vibrations on a machine component by a vibration sensor; determining a condition of the machine component on the basis of measurement data generated by the vibration sensor; and transmitting information about the condition of the machine component via a wired communication interface based on a request to provide the information.

Such a method achieves the technical advantage that the condition of a bearing and thus the condition of the machine or system can be determined. It is thus possible to detect wear and damage early and optimise the maintenance.

It further achieves the technical advantage that the method can easily be used in an automation system.

According to a third aspect, the object is achieved with a computer program comprising a program code for carrying out such a method when the program code is executed on a computer.

Such a computer program achieves the technical advantage that the condition of a bearing and thus the condition of the machine or system can be determined. It is thus possible to detect wear and damage early and optimise the maintenance. The computer program can easily be realised in a condition monitoring device according to this disclosure.

BRIEF DESCRIPTION OF THE DRAWINGS

Further examples of the principles of the present disclosure will be explained with reference to the accompanying drawings.

DETAILED DESCRIPTION

IO-link systems and IO-link devices and/or measuring devices with an IO-link interface are described in the following.

IO-link is a serial, bidirectional point-to-point connection for signal transmission and power supply under any type of network, fieldbus or rear wall bus.

An IO-link system consists of IO-link devices, usually sensors, actuators or combinations thereof, as well as a standard 3-lead sensor/actuator cable and an IO-link master. The master can be configured as a device of any design and protection type.

The IO-link master establishes the connection between the IO-link devices and the automation system. As a component of a peripheral system, the IO-link master is installed either in the control cabinet, for example, or directly in the field as a remote I/O. The IO-link master communicates via various fieldbuses or product-specific rear wall buses. An IO-link master can have several IO-Link ports (channels). An IO-link device can be connected to every port (via point-to-point communication). Therefore IO-link is a point-to-point communication.

Amongst other things, M12 connectors are defined for the connection technology in IP65/67, whereby sensors typically have a 4 pin plug and actuators have a 5 pin plug. IO-link masters generally have a 5 pin M12 socket.

According to IEC 60974-5-2, the pin assignment is specified as follows: Pin 1: 24 V; Pin 3: 0 V; Pin 4: Switching and communication line (C/Q). In addition to the IO-link communication, a power supply of the device with a maximum of 200 mA is realised via these 3 pins.

The measuring devices having a SPI and a universal asynchronous receiver-transmitter (UART) interface are described in the following. The serial peripheral interface (SPI) is a bus system for a synchronous serial data bus, with which digital circuits can be connected to each other according to the master/slave principle. A UART interface is used for sending and receiving data via a data line and is the standard for serial interfaces on personal computers (PCs), microcontrollers, as well as in the industrial sector. The data is transmitted as a serial digital data stream having a fixed frame, which consists of a start bit, five to at most nine data bits, an optional parity bit for detecting transmission errors and a stop bit.

The devices described in the following include communication interfaces that operate according to the master/slave principle. Master/slave, or host computer/satellite computer, is a hierarchical concept for the organisation and distribution of tasks between superordinate stations, in this case the master stations, and subordinate computing units, the slaves. Such concepts are used whenever a computing unit takes over control and task distribution from another.

The master/slave concept is realised in client/server architectures, fieldbuses and Bluetooth, amongst other things. In the client/server principle, the server operates as a master station, which is equipped with its own operating system, higher intelligence and greater functionality than the clients. The clients acting as slave stations are passive communication participants that are prompted to receive or send data by the master station.

MEMS sensors, in particular MEMS vibration sensors, will be described in the following. MEMS (micro-electro-mechanical systems) are tiny components that combine logic elements and micromechanical structures in a chip. They can process mechanical and electrical information. MEMS elements are used in sensors, actuators, oscillators and filters. These mechatronic chips are usually made of silicon. The structures can be smaller than a micron. As a result of the miniaturization, they can be produced cheaply and in bulk, like semiconductors. MEMS vibration sensors are designed to measure vibrations or mechanical vibrations.

Figure 1:
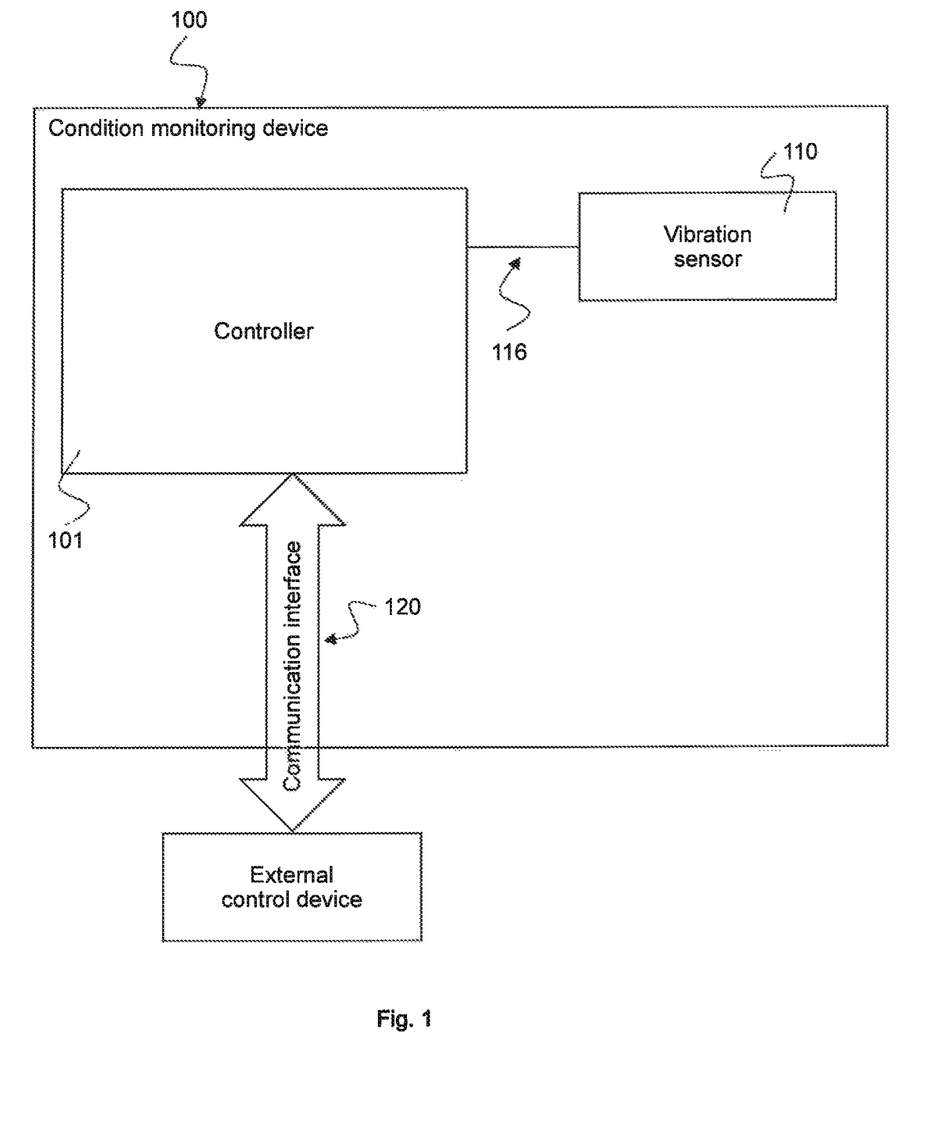
FIG. 1 shows a schematic illustration of a condition monitoring device 100 for monitoring the condition of a mechanical machine component.

FIG. 1 shows a schematic illustration of a condition monitoring device 100 for monitoring the condition of a mechanical machine component. The condition monitoring device 100 comprises a vibration sensor 110, a controller 101 and a wired communication interface 120.

The vibration sensor 110 is used to detect mechanical vibrations on the machine component. The controller 101 is coupled to the vibration sensor 110 and is configured to determine a condition of the machine component on the basis of measurement data 116 generated by the vibration sensor 110. The communication interface 120 is coupled to the controller 101 in terms of communication and is designed to communicate with an external control device. Based on a request to provide information about the condition of the machine component, the controller 101 is configured to transmit the requested information via the wired communication interface 120.

The communication interface 120 can, for example, be configured to couple the condition monitoring device 100 to the external control device via a point-to-point connection. The communication interface 120 can be configured to supply the condition monitoring device with external DC voltage.

The controller 101 can operate as a slave in a master/slave operation and can be controlled via the communication interface 120.

Figure 2:
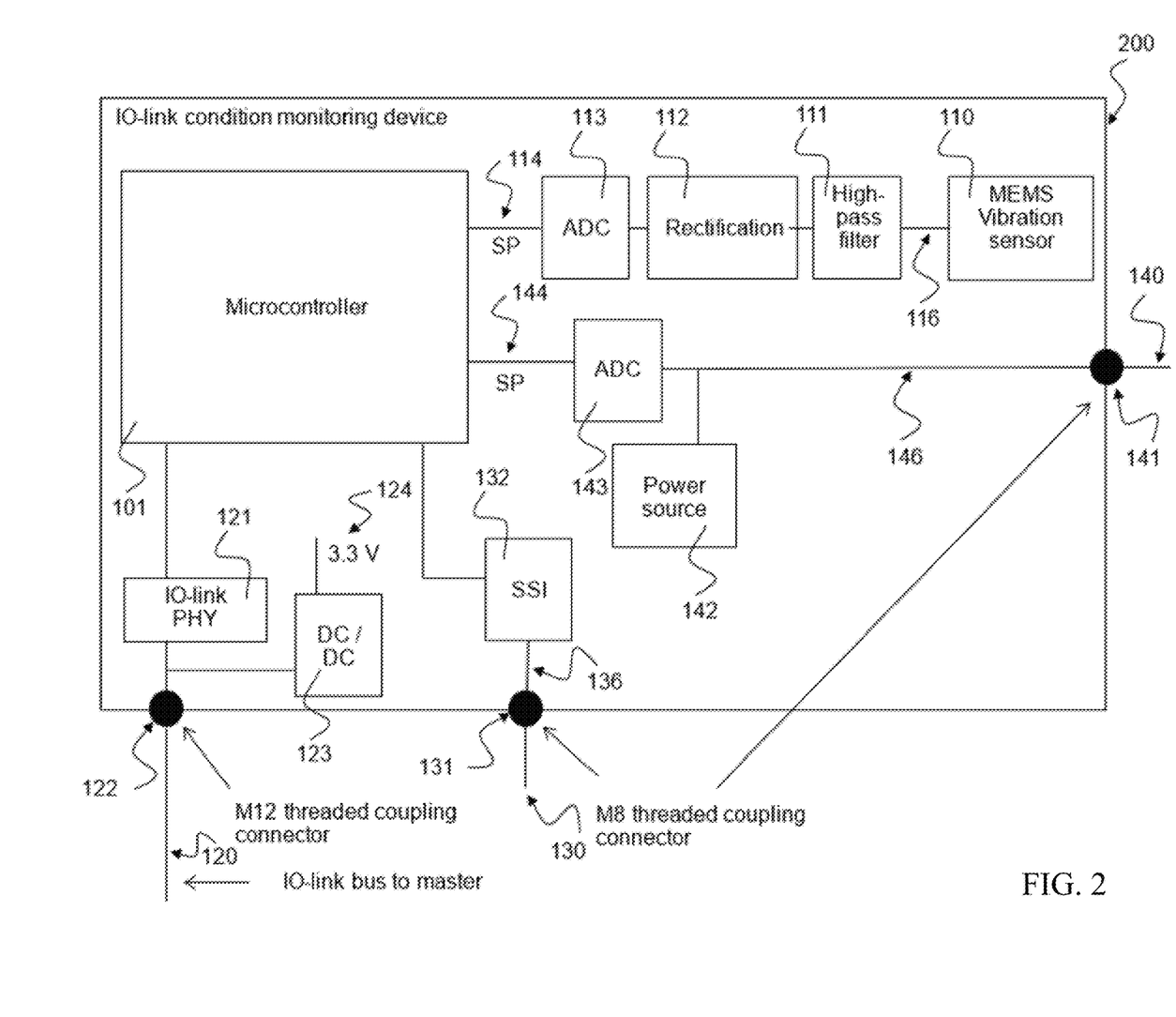
FIG. 2 shows a schematic illustration of an IO-link device 200 for condition monitoring according to a first example.
Figure 3:
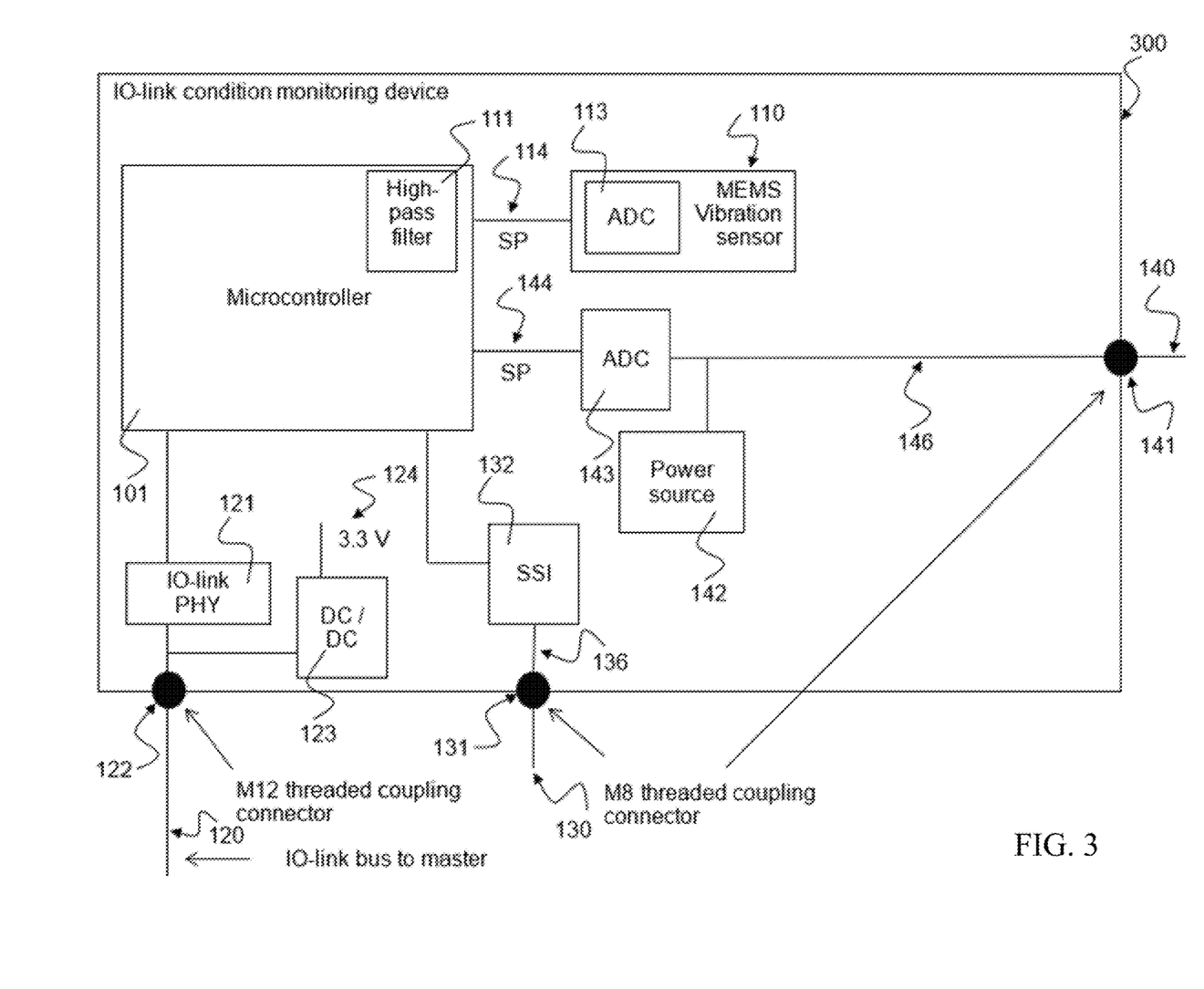
FIG. 3 shows a schematic illustration of an IO-link device 300 for condition monitoring according to a second example.

The communication interface 120 can comprise an IO-link interface, as described in FIGS. 2 and 3, for example.

The condition monitoring device 100 can comprise an IO-link PHY module 121, as shown in FIGS. 2 and 3 for example, which is configured to transmit the information about the condition of the machine component to the external control device.

In an example, the condition monitoring device 100 comprises a DC converter 123, which is configured to convert the external DC voltage supplied via the communication interface 120 into an internal system voltage 124, for example according to the illustration in FIG. 2 or 3.

In one example, the condition monitoring device 100 can comprise a first input 140 for connecting at least one external temperature sensor for recording at least one temperature of the machine component, as shown in FIGS. 2 and 3 for example. The controller 101 can be configured to further determine the condition of the machine component on the basis of measurement data 146 from the first input 140, as described in FIGS. 2 and 3 for example.

The first input 140 can comprise a plurality of RTD lines for connecting at least one external resistance temperature sensor. The condition monitoring device 100 can further comprise an internal power source 142, as shown in FIGS. 2 and 3 for example, which is configured to drive a prespecified current through the at least one external resistance temperature sensor via the RTD lines. The condition monitoring device 100 can further comprise a first analogue to digital (A/D) converter 143, as shown in FIGS. 2 and 3 for example, which is configured to detect a voltage drop at the RTD lines and relay it to the controller 101 converted to a digital value. The controller 101 can be configured to calculate a resistance proportional to the measured temperature of the at least one resistance temperature sensor on the basis of the voltage drop at the RTL) lines and the prespecified current driven via the RTD lines.

The condition monitoring device 100 can further comprise a second input 130 for connecting at least one external speed and/or position sensor for recording at least one speed and/or position of the machine component, as shown in FIGS. 2 and 3 for example. The controller 101 can be configured to further determine the condition of the machine component on the basis of measurement data 136 from the second input 130. The condition monitoring device 100 can further comprise at least one Synchronous Serial Interface (SSI) 132, as shown in FIGS. 2 and 3 for example, which is configured to read the measurement data 136 of the at least one external speed and/or position sensor connected to the second input 130 and transmit said data to the controller 101.

The vibration sensor 110 can, for example, be configured as a MEMS-based semiconductor-based vibration sensor.

The controller 101 can be configured to determine an amplitude spectrum on the basis of the measurement data 116 generated by the vibration sensor 110, for example using a frequency transformation such as a Discrete Fourier Transform (DFT) or a Fast Fourier Transform (FFT).

In one example, the condition monitoring device 100 can comprise a high-pass filter 111 for filtering the measurement data 116 generated by the vibration sensor 110, as well as a rectifier 112 for rectifying the high-pass filtered measurement data of the vibration sensor 110 and a second analogue to digital (A/D) converter 113 for converting the rectified high-pass-filtered measurement data of the vibration sensor 110 to digital measurement data, as shown in FIGS. 2 and 3 for example. The controller 101 can be configured to determine the amplitude spectrum on the basis of the digital measurement data of the vibration sensor 110.

In one example, the second A/D converter 113 can be integrated in the vibration sensor 110, as shown in FIG. 3 for example. The high-pass filter 111 can be realised as a function in the controller 101, for example as a DSP (digital signal processing) function.

In one example, the communication interface 120 can comprise an M12 threaded coupling connector 122 for activating the external control device and for the power supply, as shown in FIGS. 2 and 3 for example.

FIG. 2 shows a schematic illustration of an IO-link device 200 for condition monitoring according to a first example.

The IO-link device 200 is a special example of the condition monitoring device 100 described above with respect to FIG. 1. The IO-link device 200 comprises a vibration sensor 110, a controller 101 and an IO-link interface 120.

The vibration sensor 110 is used to detect mechanical vibrations on the machine component. The controller 101 is coupled to the vibration sensor 110 and is configured to determine a condition of the machine component on the basis of measurement data 116 generated by the vibration sensor 110. The IO-link interface 120 is coupled to the controller 101 in terms of communication and is designed to communicate with an external control device, for example an IO-link master. Based on a request from the external control device to provide information about the condition of the machine component, the controller 101 is configured to transmit the requested information to the external control device via the wired communication interface 120.

The IO-link device 200 comprises an IO-link PHY module, which realises communication to the IO-link master at a physical level and transmits data from the IO-link device 200, which is functioning as a slave, to the control device, which is functioning as a master. The communication interface comprises an M12 threaded coupling connector 122, to which a cable can be screwed to connect the IO-link device 200 to the control device. The supply voltage of the IO-link device 200, which can be converted into the system voltage of the IO-link device 200, e.g., 3.3 V, in a DC/DC component, is transmitted via the IO-link 120.

The vibration sensor 110 is configured as a MEMS vibration sensor and is coupled to a SPI interface of the microcontroller 101 via a high-pass filter 111, a rectifier 112 and an analogue to digital converter 113.

A first input 140 serves to connect one or more temperature sensors, e.g., resistance thermometers, via an M8 threaded coupling connector 141. A power source 142 supplies a predefined current to drive the temperature sensors with electricity. The resulting temperature-dependent voltage change is recorded by a second analogue to digital converter 143 and converted to a digital measured value, which is transmitted to a SPI interface 144 of the microcontroller 101.

A second input 130 serves to connect one or more speed and/or position sensors via an M8 threaded coupling connector 131. The measured values 136 of these sensors are read by an SSI interface 132 and made available to the microprocessor.

In the case of the IO-link device 200 shown in FIG. 2, the above-mentioned functions such as vibration, temperature and speed measurement are combined in a device. The evaluation of the measurement signals is also carried out in the device. The sensor/actuator bus standard IO-link is selected as the bus system. A 24 V power supply, which serves as a supply for the device 200, is also provided via the IO-link cable 120. The device 200 is connected with only one cable and can therefore be screwed directly to the machine in a decentralised manner. In addition to the condition of the bearing, measured values such as spectrum and amplitude of the vibration, as well as bearing temperature and speed, can be transmitted via the bus 120 as well. Using the user parameterised data relating to the bearing, such as speed and maximum bearing temperature, the condition of the bearing and the remaining service life in the device 200 are calculated by the microcontroller 101. In addition to using only one device, the user is also spared the cost of an expensive, external piezo vibration sensor.

The device 200 is configured as an IO-link slave (device) and is connected to the IO-link master via the standardised M12 threaded coupling connector 122. A 24 V operating voltage, with which the device 200 is supplied, is also provided in the IO-link line 120 in addition to the bus signals. Using an integrated DC/DC converter 123, the 3.3 V system voltage 124 is generated from the 24 V in the device 200. The data from the slave 200 is transmitted to the master via the IO-link PHY 121.

The device 200 has an integrated MEMS-based (semiconductor-based) vibration sensor 110. For an optimum evaluation of the spectrum and the amplitude of the vibration, the analogue sensor signals 116 are first discretely high-pass filtered 111, rectified 112 and collected by an analogue to digital converter 113. The transmission of the measured values from the application delivery controller (ADC) 113 to the microcontroller 101 takes place via an SPI interface 114.

The ADC 113 can alternatively be integrated in the vibration sensor 110, as shown in the second example of the IO-link device 300 in FIG. 3. The data is transmitted to the microcontroller 101 via an SPI interface 114. The high-pass filter 111 is realised in the microcontroller 101 with a DSP function, as shown in FIG. 3. An amplitude spectrum is calculated from the discrete time measured values in the microcontroller 101 using an FFT (fast Fourier transform).

Temperature sensors can be connected to the two or more RTD temperature inputs 140 using M8 threaded coupling connectors 141, e.g., PT100. The electrical resistance of the sensor is proportional to the temperature. Internal power sources 142 drive a defined current through the temperature sensor. The voltage drop at the sensor measured with an analogue to digital converter 143 is transmitted to the microcontroller 101 via an SPI interface 144. The temperature-proportional resistance is calculated in the microcontroller 101 using the voltage drop and the driven current.

Speed or position sensors can be connected to the one or more SSI interfaces 132. The data is transmitted from the sensor to the microcontroller 101 via the hardware driver and evaluated by the microcontroller.

The microcontroller 101 records the individual sensor signals and from them calculates the bearing temperature, the speed, the amplitude and spectrum of the vibration, and the condition of the bearing. The microcontroller 101 is connected to the IO-link PHY 121 via a UART interface, includes the IO-link stack and establishes the communication to the master for data transmission.

FIG. 3 shows a schematic illustration of an IO-link device 300 for condition monitoring according to a second example.

The IO-link device 300 is a special example of the condition monitoring device 100 described above with respect to FIG. 1. The IO-link device 300 corresponds to the IO-link 200 described in FIG. 2, wherein the analogue to digital converter 113 is integrated in the MEMS vibration sensor 110 and the high-pass filter 111 is realised as a function, e.g., a DSP function, in the microcontroller 101.

FIGS. 2 and 3 thus respectively show an IO-link device 200, 300 having an M12 threaded coupling connector 122 for the bus interface and the power supply; an integrated DC/DC converter 123 for generating the internal system voltage; an integrated microcontroller 101 for signal processing and signal evaluation and bus communication; an integrated MEMS-based vibration sensor 110 for vibration measurement (amplitude and spectrum); RTD inputs 140 for connecting external temperature sensors with M8 threaded coupling connectors 141; and SSI inputs 130 for connecting external speed and position sensors with M8 threaded coupling connectors 131.

Figure 4:
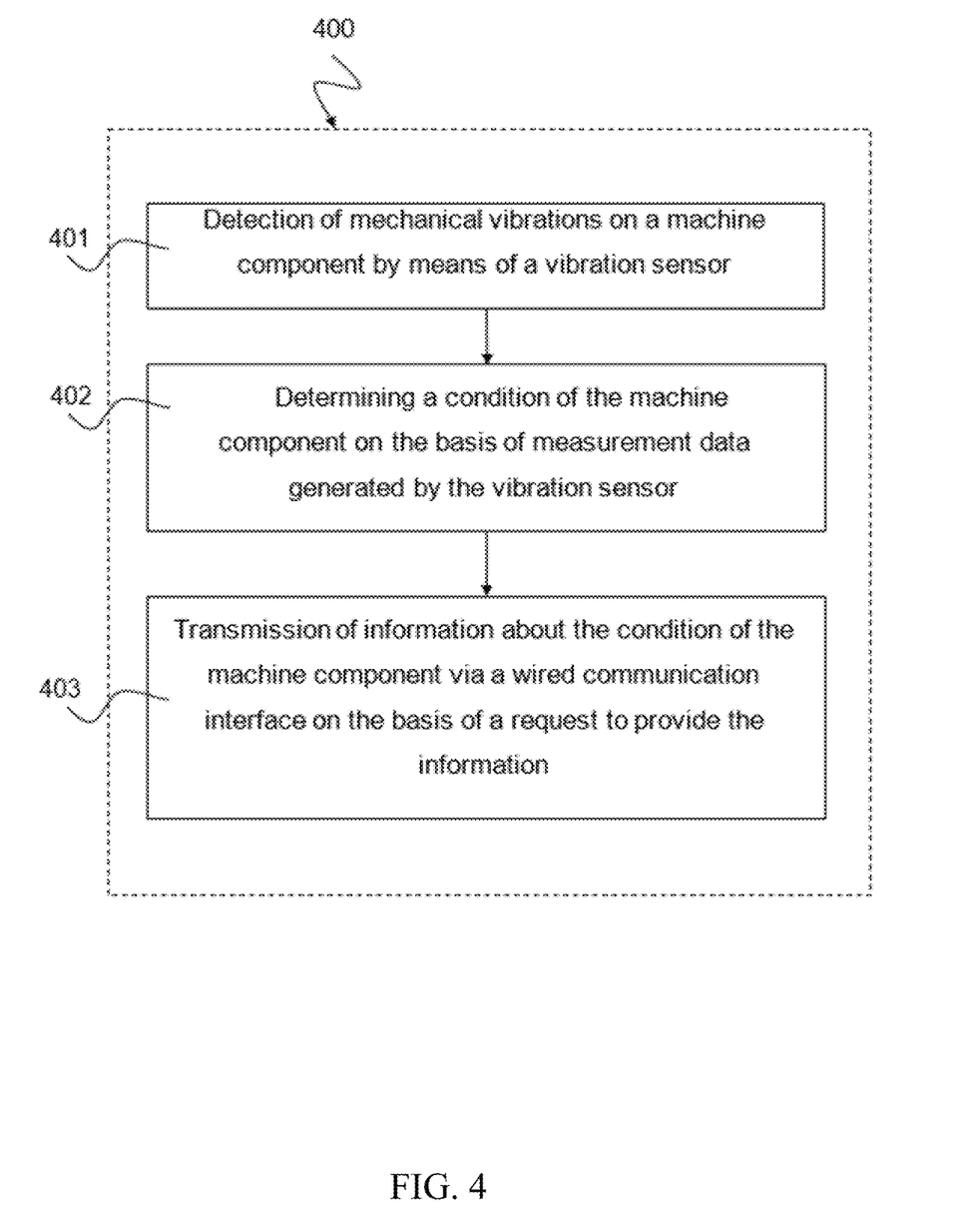
FIG. 4 shows a schematic illustration of a method 400 for monitoring the condition of a mechanical machine component.

FIG. 4 shows a schematic illustration of a method 400 for monitoring the condition of a mechanical machine component.

The method 400 comprises the following steps: Detection 401 of mechanical vibrations on a machine component by a vibration sensor; determining 402 a condition of the machine component on the basis of measurement data generated by the vibration sensor; and transmitting 403 information about the condition of the machine component via a wired communication interface based on a request to provide the information.

The method 400 can, for example, be realised in a condition monitoring device 100 or an IO-link device 200, 300 as described above with respect to FIGS. 1 to 3.

LIST OF REFERENCE NUMBERS

100 Condition monitoring device
101 Controller, microcontroller
110 Vibration sensor, MEMS vibration sensor
111 High-pass filter
112 Rectifier
113 Analogue to digital converter
114 SPI interface
116 Measurement data of the vibration sensor
120 Communication interface wired, IO-link bus to master
121 IO-link PHY
122 M12 threaded coupling connector
130 Second input
131 M8 threaded coupling connector
132 SSI interface
136 Measurement data of the second input
140 First input
141 M8 threaded coupling connector
142 Power source
143 Analogue to digital converter
144 SPI interface
146 Measurement data of the first input
200 IO-link device according to the first example
300 IO-link device according to the second example
400 Method for monitoring the condition of a mechanical machine component
401 First step: Recording
402 Second step: Determining
403 Third step: Transmitting

What is claimed is:

1. An input output link (IO-Link) condition monitoring device for monitoring a condition of a mechanical machine component, comprising:
   a vibration sensor configured to detect mechanical vibrations on the mechanical machine component;
   a first input configured to connect at least one external temperature sensor configured to record at least one temperature of the mechanical machine component, wherein the first input comprises a plurality of resistant temperature detection (RTD) lines configured to connect to at least one external resistance temperature sensor;
   a controller coupled to the vibration sensor and configured to determine the condition of the mechanical machine component based at least in part on measurement data generated by the vibration sensor, wherein the controller is configured to determine the condition of the mechanical machine component based at least in part on measurement data from the first input;
a first analog-to-digital (A/D) converter configured to detect a voltage drop at the plurality of resistant temperature detection lines and relay a digital value of the voltage drop to the controller; and
a wired IO-Link communication interface coupled to the controller and configured to communicate with an external control device, wherein:
the controller is configured to operate as a slave in a master/slave operation and to be controlled via the wired IO-Link communication interface, and
based at least in part on a request to provide information about the condition of the mechanical machine component, the controller is configured to transmit the requested information via the IO-Link wired communication interface; wherein the condition of the mechanical component is classified as one of: no damage, slight predamage, or defective.

2. The IO-Link condition monitoring device according to claim 1, wherein the wired IO-Link communication interface is configured to couple the IO-Link condition monitoring device to the external control device via a point-to-point connection.

3. The IO-Link condition monitoring device according to claim 1, wherein the wired IO-Link communication interface is configured to supply the IO-Link condition monitoring device with external direct current (DC) voltage.

4. The IO-Link condition monitoring device according to claim 3, further comprising:
a DC converter configured to convert the external DC voltage supplied via the wired IO-Link communication interface to an internal system voltage.

5. The IO-Link condition monitoring device according to claim 1, further comprising:
an IO-link physical layer (PHY) circuit configured to transmit information about the condition of the mechanical machine component to the external control device.

6. The IO-Link condition monitoring device according to claim 1, further comprising:
an internal power source configured to drive a prespecified current through the at least one external resistance temperature sensor via the plurality of RTD lines.

7. The IO-Link condition monitoring device according to claim 6, wherein the controller is configured to calculate a resistance proportional to a measured temperature of the at least one external resistance temperature sensor based at least in part on the voltage drop at the plurality of RTD lines and the prespecified current driven via the plurality of RTD lines.

8. The IO-Link condition monitoring device according to claim 1, further comprising:
a second input configured to connect at least one external speed or position sensor configured to record at least one speed or position, respectively, of the mechanical machine component,
wherein the controller is configured to determine the condition of the mechanical machine component based at least in part on measurement data from the second input.

9. The IO-Link condition monitoring device according to claim 8, further comprising:
at least one Synchronous Serial Interface (SSI) configured to read measurement data of the at least one external speed or position sensor connected to the second input and transmit the measurement data from the second input to the controller.

10. The IO-Link condition monitoring device according to claim 1, wherein the vibration sensor is configured as a microelectromechanical system (MEMS)-based semiconductor-based vibration sensor.

11. The IO-Link condition monitoring device according to claim 1, wherein the controller is configured to determine an amplitude spectrum based at least in part on the measurement data generated by the vibration sensor.

12. The IO-Link condition monitoring device according to claim 11, further comprising:
a high-pass filter configured to filter the measurement data generated by the vibration sensor;
a rectifier configured to rectify the high-pass filtered measurement data of the vibration sensor; and
a second analogue to digital (A/D) converter configured to convert the rectified high-pass filtered measurement data of the vibration sensor to digital measurement data,
wherein the controller is configured to determine the amplitude spectrum based at least in part on the digital measurement data of the vibration sensor.

13. The IO-Link condition monitoring device according to claim 12, wherein the second A/D converter is integrated in the vibration sensor, and wherein the high-pass filter comprises a function in the controller.

14. The IO-Link condition monitoring device according to claim 1, wherein the wired IO-Link communication interface comprises an M12 threaded coupling connector configured to activate the external control device and to connect to a power supply.

15. A method for monitoring a condition of a mechanical machine component, comprising:
detecting, by a vibration sensor, mechanical vibrations on the mechanical machine component;
connecting, by a first input, at least one external temperature sensor configured to record at least one temperature of the mechanical machine component, wherein the first input comprises a plurality of resistant temperature detection lines configured to connect to at least one external resistance temperature sensor;
determining, by a controller, the condition of the mechanical machine component based at least in part on measurement data generated by the vibration sensor and measurement data from the first input, wherein an analog-to-digital (A/D) converter detects a voltage drop at the plurality of resistant temperature detection lines and relays a digital value of the voltage drop to the controller, wherein the controller is configured to operate as a slave in a master/slave operation and to be controlled via a wired IO-Link communication interface; and
transmitting, by the controller, via the wired IO-Link communication interface to an external control device, information about the condition of the mechanical machine component based at least in part on a request to provide the information, wherein the condition of the mechanical component is classified as one of: no damage, slight predamage, or defective.

* * * * *